Oct. 12, 1926.  
F. K. KNILL  
1,603,118  
FISH LURE  
Filed Nov. 12, 1923
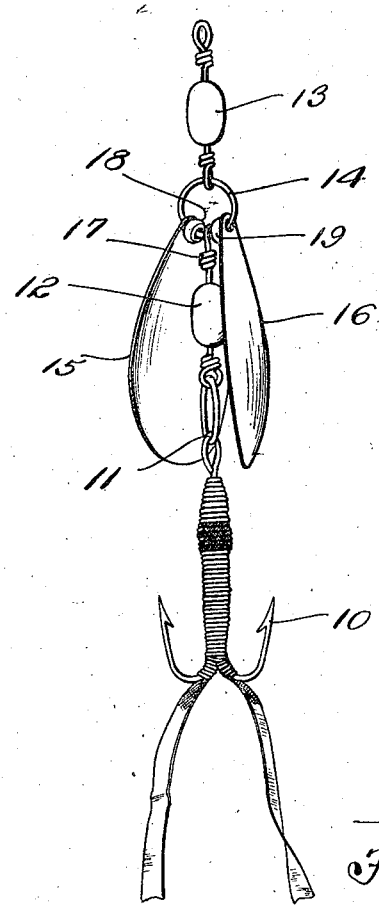
INVENTOR  
Frank K. Knill  
BY Bates & Macklin  
ATTORNEYS Patented Oct. 12, 1926.

1,603,118

UNITED STATES PATENT OFFICE.

FRANK K. KNILL, OF VERMILION, OHIO.

FISH LURE.

Application filed November 12, 1923. Serial No. 674,117.

This invention relates to artificial fish bait and particularly to the type of bait which is adapted to be moved through the water.

A form of bait frequently employed for trolling purposes comprises a chain having one or more spinners attached thereto forward of a hook. The usual practice has been particularly where more than one spinner is used, to place the spinners in tandem fashion along the links of the chain. I have found that the use of spinners in this manner, causes the bait to move in substantially the path traced by the boat.

One of the objects of my invention therefore, is the provision of a bait which is so made that it is caused to lunge or move with a zig-zag path through the water rather than to follow the path defined by the travel of the boat. An advantage of this irregular travel of the bait is that the lure is thereby caused to simulate the movement of a live bait.

A further object of my invention is the production of a bait which may be cheaply and easily made.

The preferred form of carrying out my invention will be fully set forth in the following description which relates to the accompanying drawing. The essential characteristics will be summarized in the claim:

In the drawings, I have shown a view of a fish lure embodying my invention.

The bait illustrated comprises a set of hooks 10 which are arranged to be secured as at 11 to one end of a chain which includes swivels indicated at 12 and 13. Between the swivels I have shown a link 14 which is arranged to carry spinners 15 and 16. The practice heretofore has been to use one spinner upon the link 14 and to employ a longer chain with additional links and swivels in the event more than one spinner is used.

The spinners illustrated are of the usual construction, embodying a convex outer surface and a concave inner surface and are placed on the link 14 in such manner that the concave surfaces are normally facing towards the chain. Each spinner is moreover spaced from the link 17 of the chain by spacing sleeves 18 and 19 respectively. These sleeves are free to slide on the link 14 and serve to hold the spinners slightly inclined with reference to the chain. Thus, upon movement of the bait through the water each spinner is free to slide along the link 14 independently of the other.

When a bait made in accordance with my invention is moved through the water, then the spinners are forced outwardly from the chain in the usual manner. I have found, however, that the use of a pair of spinners on a common link has a distinctive effect upon the course of travel of the bait. This is manifested by the fact that the bait is caused to deviate from the normal path and to lunge, or tack, thereby defining a zig-zag path through the water. I have also found upon sudden increase in acceleration such as upon the stroke of the oars that the bait is caused to deviate at a sharper angle than when the boat is moving with uniform velocity. This same effect can be accomplished by jerking the line to which the bait is attached, while it is being moved through the water.

An advantage of a bait made in accordance with my invention is the attainment of a motion simulating that of a live bait while it is being moved through the water.

Having thus described my invention, I claim:

A fish bait comprising, in combination, two swivel members, a link connecting the proximate ends of the two members, a hook connected with the distant end of one member, a pair of spoons loosely mounted on the link respectively on opposite sides of the last mentioned swivel member, and a pair of beads on said link respectively between the spoons and the last mentioned swivel member.

In testimony whereof, I hereunto affix my signature.

FRANK K. KNILL.